United States Patent [19]

Teigen

[11] Patent Number: 4,593,630
[45] Date of Patent: Jun. 10, 1986

[54] APPARATUS FOR FLUIDIZING A PARTICULATE MATERIAL IN A CONVEYING GAS

[75] Inventor: Bard C. Teigen, Enfield, Conn.

[73] Assignee: Combustion Engineering, Inc., Windsor, Conn.

[21] Appl. No.: 670,730

[22] Filed: Nov. 13, 1984

[51] Int. Cl.[4] ............................................. F23G 7/00
[52] U.S. Cl. ................................. 110/245; 122/4 D; 110/101 R; 110/106
[58] Field of Search .................. 110/245, 101 R, 106; 432/58; 122/4 D

[56] References Cited

U.S. PATENT DOCUMENTS

| | | | |
|---|---|---|---|
| 4,275,668 | 6/1981 | Daman | 110/245 |
| 4,335,661 | 6/1982 | Stewart | 432/58 |
| 4,349,969 | 9/1982 | Stewart et al. | 122/4 D |
| 4,354,439 | 10/1982 | Baunack | 110/347 |
| 4,357,883 | 11/1982 | Comparato et al. | 432/58 |
| 4,434,726 | 3/1984 | Jones | 110/245 |
| 4,445,443 | 5/1984 | Stewart et al. | 110/245 |

Primary Examiner—Henry C. Yuen
Attorney, Agent, or Firm—William W. Habelt

[57] ABSTRACT

A fluidizing feed apparatus (20) for supplying particulate material to a fluidized bed furnace (12) having a housing (22) which defines a chamber which is divided by a perforated distribution plate (24) into a gas plenum (26) beneath the plate and a particulate fluidizing plenum (28) above the plate. Conveying gas is fed under pressure to the gas plenum to pass upwardly therefrom through the perforated distribution plate. The upwardly directed conveying gas fluidizes the particulate material so as to establish a discrete bed (60) of fluidized particulate material superadjacent the distribution plate (24) and a splash zone (70) thereabove. Transport conduits (14) open into the splash zone (70) at a selected distance above the surface (65) of the discrete bed (60) to receive particulate material and conveying gas therefrom for transport to the fluidized bed (16) of the furnace (12). An orificing nipple body (82) is replaceably mounted to at least one transport conduit (14) and acts as a throttling device to control the flow of particulate material therethrough relative to the flow of particulate material through the remaining transport conduits.

1 Claim, 3 Drawing Figures

APPARATUS FOR FLUIDIZING A PARTICULATE MATERIAL IN A CONVEYING GAS

BACKGROUND OF THE INVENTION

The present invention relates to an apparatus for fluidizing a particulate material in a conveying gas for transport and distribution, and, more particularly, to such an apparatus adapted for feeding particulate material in a conveying gas to a fluidized bed furnace.

In a typical present day fluidized bed furnace, particulate fuel, such as coal having a top size ranging from about 3.0 to about 6.5 mm, is typically fed to and combusted within a fluidized bed of similar sized particulate material at relatively low temperatures of 760° C. to 925° C. If the fuel being burned contains sulfur, it is customary that the particulate material making up the bed be comprised of a sulfur absorbent, most commonly limestone, in addition to the particulate fuel. Fluidizing air, which also serves as combustion air, is supplied to the fluidized bed from an air plenum located beneath the bed support plate. The fluidizing air passes upwardly from the air plenum into the fluidized bed through a plurality of holes in the bed support plate at a flow rate sufficiently high to fluidize the particulate material within the fluidized bed.

A number of different approaches have been suggested for feeding particulate material to the bed, including overbed feed systems and underbed feed systems. One particular underbed feed system suitable for feeding particulate material to a fluidized bed is disclosed in U.S. Pat. No. 4,356,779. As disclosed therein, a fuel feeder is disposed beneath the fluidized bed combustor for entraining fuel in air and then feeding that fuel upwardly into the combustor. The feeder housing defines a chamber which is divided into upper and lower sections by a horizontally disposed perforated distributor plate. The particulate fuel to be supplied to the fluidized bed is fed into the upper chamber above the perforated distributor plate while conveying air is supplied to the lower chamber beneath the perforated distributor plate. The air supplied to the lower chamber passes upwardly through the perforated distributor plate to fluidize and entrain the particulate coal in the upper region of the chamber. The entrained coal is then carried upwardly from the chamber to the fluidized bed boiler through transport lines which open to the fluidizing chamber through the roof of the feeder. In the feeder disclosed in U.S. Pat. No. 4,356,779, there is no provision to permit control of the output of particulate material through each of the individual transport lines. Assuming that the lengths of the transport lines from the feeder to its endpoint destination are equal, the output of particulate material from the disclosed feeder would be necessarily evenly distributed amongst the various transport lines leading from the feeder. No provision is made to permit an uneven or selective distribution of the output or to compensate for an inherent uneven distribution of output due to unequal line length.

A feeder apparatus which addresses this disadvantage is disclosed in commonly assigned co-pending application Ser. No. 576,599, filed Feb. 3, 1984, in the name of Joseph R. Comparato. The feeder comprises a housing defining a chamber which is divided by means of a perforated bed support plate disposed thereacross into a gas plenum subadjacent the plate and a particulate fluidizing plenum superadjacent the plate. Gas supply means open into the gas plenum for conveying a pressurized conveying gas therethrough to pass upwardly through the perforated bed support plate to fluidize particulate material deposited in the particulate fluidizing plenum so as to establish a discrete bed of fluidized particulate material superadjacent the plate. Particulate material is fed to the fluidizing plenum through a feed column penetrating the roof of the housing and extending downwardly therein to terminate in the vicinity of the bed support plate so that particulate material is supplied to the chamber at a location beneath the surface of the discrete bed. Additionally, a plurality of vertically positionable transport conduits extend into the particulate fluidizing chamber so as to open into the splash zone at a desired distance above the surface of the discrete bed to receive particulate material and conveying gas from the splash zone. By independently adjusting the position of the transport conduits relative to the surface of the bed, the solids flowing through any particular transport conduit may be varied. In order to permit the transport conduits to be vertically adjustable, seal means must be provided which permit the vertical translation of the conduits through the support plate while sealing the gas plenum from the particulate fluidizing plenum to preclude particulate from passing into the gas plenum.

It is an object of the present invention to provide an apparatus for fluidizing a particulate material in a conveying gas wherein the output of particulate material is selectively distributable amongst a plurality of transport lines leading from the feed apparatus.

It is a further object of the present invention to provide such an apparatus wherein the output of particulate material through a transport line leading therefrom may be adjusted without movement of the line.

SUMMARY OF THE INVENTION

The apparatus of the present invention comprises a housing defining a chamber therein which is divided into a gas plenum and a particulate fluidizing plenum above the gas plenum by means of a perforated bed support plate disposed within the housing across the chamber. Gas supply means open into the gas plenum for conveying pressurized conveying gas through the gas plenum to pass upwardly therefrom through the gas passages of the perforated bed support. The upwardly passing conveying gas fluidizes the particulate material in the particulate fluidizing plenum so as to establish within the housing a discrete bed of fluidized particulate material superadjacent the bed support plate and a splash zone above the discrete bed. A fraction of the fluidized particulate material carries over from the discrete bed into the splash zone as bubbles of upwardly passing conveying gas erupts through the surface of the discrete bed.

Particulate feed means penetrates the housing and extends into the fluidizing plenum so as to deposit particulate material into the fluidized bed established therein at a location beneath the surface of the discrete bed. A plurality of transport conduits also penetrate the housing and extend into the particulate fluidizing plenum so as to open into the splash zone at a desired distance above the surface of the discrete bed. The transport conduits receive particulate material and conveying gas from the splash zone and convey the received particulate material in the conveying gas to a desired designation such as the combustion chamber of a fluidized bed furnace.

In accordance with the present invention, orificing nipple means are replaceably mounted to the inlet of at least one of the transport conduits. The orificing nipple means has an inlet opening to the splash zone which has a cross-sectional area less than the cross-sectional area of the inlet to the transport conduit associated therewith. The orificing nipple means further includes an outlet opening to the inlet of the transport conduit associated therewith, the outlet preferably having a cross-section area greater than that of the inlet to the nipple means such that a diverging flow passageway is defined therethrough from the inlet of the nipple means to the outlet of the nipple means.

BRIEF DESCRIPTION OF THE DRAWING

Other objects, features and advantages of the present invention will be evident from the following description of the preferred embodiment of the fluidizing feed apparatus of the present invention and the accompanying drawing wherein the feed apparatus is utilized to supply particulate material to a fluidized bed furnace.

DESCRIPTION OF A PREFERRED EMBODIMENT

Figure 1:
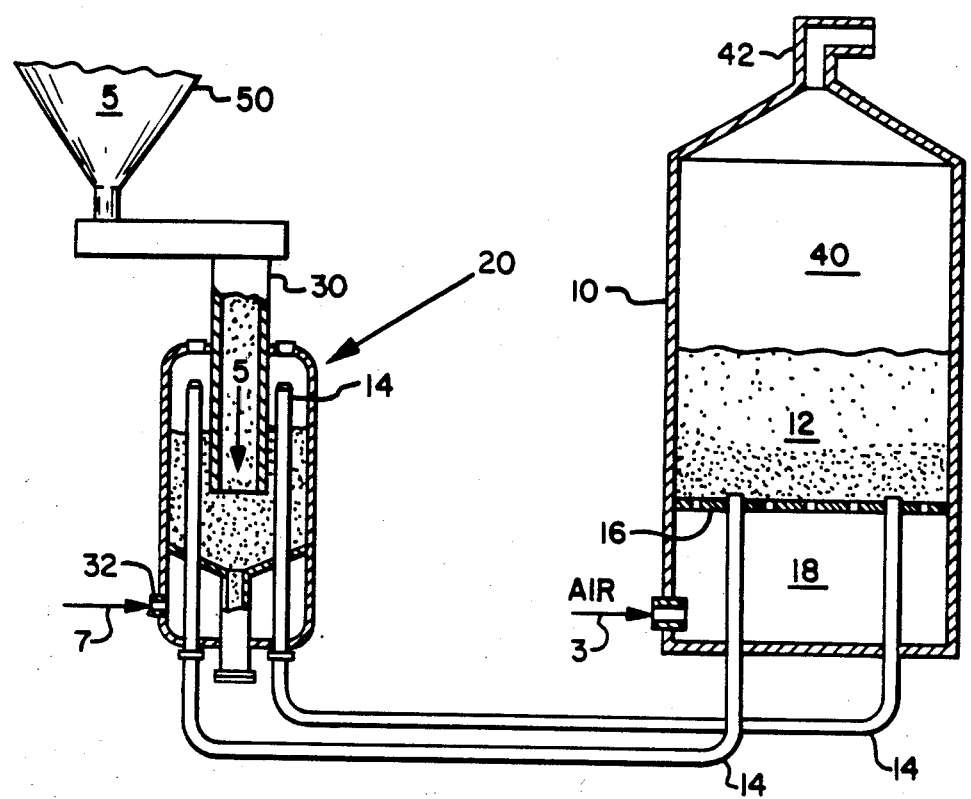
FIG. 1 is a diagrammatic view, partly in section, showing the feed apparatus of the present invention supplying particulate coal and sulfur absorbent to a fluidized bed furnace.

Referring now to FIG. 1, there is depicted therein a fluidized bed furnace 10 wherein a sulfur-containing fuel, such as particulate coal, is combusted in a fluidized bed 12 of particulate material which includes a sulfur oxide absorbent. Typically, the sulfur oxide absorbent is selected from the group consisting of limestone, lime, dolomite and soda ash. It is to be understood that the term limestone used herein is to be read to encompass other sulfur oxide absorbents including, but not limited to, dolomite, lime or soda ash, and that the term particulate coal as used herein is to be read to include other particulate fuels.

Particulate coal is supplied to the furnace fluidized bed 12 through a plurality of transport lines 14 which extend upwardly into the bed through the bed support plate 16 from the fluidizing feed apparatus 20. Combustion air is supplied to the air plenum 18 located beneath the fluidized bed support plate 16 and passes upwardly from the air plenum 18 into the fluidized bed 12 through a plurality of airports in the bed support plate 16 at a flow rate sufficiently high enough to fluidize the particulate material within the fluidized bed 12. The particulate coal combusts within the fluidized bed 12 and the freeboard region 40 thereabove to form hot flue gas which passes out of the fluidized bed furnace 10 through flue 42 to downstream steam generating equipment, not shown.

The feed apparatus 20 of the present invention is depicted disposed alongside the fluidized bed furnace 10 and connected therewith by the transport lines 14 which extend downwardly from the feed apparatus 20, thence horizontally over to the fluidized bed furnace 10, and thence upwardly through the bed support plate 16 to open into the fluidized bed 12. The feed apparatus 20 comprises a housing 22, preferably a cylindrical housing, defining a chamber therein which is divided by a perforated distribution plate 24 into a gas plenum 26 disposed beneath the distribution plate 24 and a particulate fluidizing plenum 28 disposed above the distribution plate 24.

Conveying gas 7 passes into the fluidizing feed apparatus 20 through gas supply means 32 which opens into the gas plenum 26 beneath the bed support plate 24 through an opening in the housing 22. The pressurized conveying gas 7 supplied to the gas plenum 26 passes upwardly through a plurality of flow passages 34 in perforated distribution plate 24 into the fluidizing plenum 28 whereby the particulate material 5 fed to the particulate fluidizing chamber 28 is fluidized so as to establish a discrete bed 60 of fluidized material superadjacent the bed support plate 24 and a splash zone 70 above the discrete bed of fluidized material.

A plurality of transport conduits 14 penetrate the housing 22 of the feeder 20 and provide a plurality of flow passages interconnecting the feeder 20 with the fluidized bed 12 in the fluidized bed furnace 10. The transport conduits 14 extend into the fluidizing plenum 28 of the housing 22 so as to open into the splash zone 70 at a distance above the discrete bed, that is at a distance above the surface 65 of the discrete bed which forms the interface between the discrete fluidized bed 60 and the splash zone 70. The transport conduits 14 receive particulate material and conveying gas from the splash zone 70 of the fluidizing plenum 28 and convey the received particulate material in the conveying gas from the feeder 20 to the fluidized bed 12 of the furnace 10.

The particulate materials to be fluidized, which when feeding a fluidized bed furnace may be a particulate coal, alone or together with a particulate sulfur oxide absorbent such as limestone, are supplied to the particulate fluidizing chamber 28 of the feed apparatus 20 from storage silo 50 via a conventional feeder 62 through particulate feed means 30. Preferably, the particulate feed means 30 comprises a tubular conduit which penetrates the roof of the housing 22 and extends downwardly into the discrete fluidized bed 60 so that particulate material passing therethrough is deposited into the discrete bed 60 beneath the surface 65 thereof at a location superadjacent the perforated distribution plate 24. The column of particulate material retained within the tubular conduit 30 provides a material head that seals the feeder 62 and silo 50 from the pressure in the fluidizing chamber 28. Alternately, conventional seal means, such as a two-valve lock chamber, may be used to seal against the pressure in the chamber of the feeder 20.

The perforated bed support plate 24 disposed within the housing 22 of the feeder 20 is preferably in the form of a concave upward conical dish as shown in the drawings so as to provide a downward sloping surface. A drain opening 38 is disposed in the sloping distribution plate 24 at the lower region thereof. A drain pipe 44 opens at its upper end to the drain opening 38 in the sloping distribution plate 24 for receiving any non-fluidized particulate material 11 from the particulate fluidizing plenum 28. The drain pipe 44 extends externally to the housing 22 for removing the non-fluidized particulate material passing through the drain pipe 44 from the particulate fluidized plenum 28.

The plurality of transport conduits 14 penetrating the housing 22 and extending into the particulate fluidizing plenum 28 open into the splash zone 70 at a selected distance above the surface 65 of the discrete bed 60 for receiving particulate material and conveying gas from the splash zone 70. Particulate material is carried over from the discrete bed 60 into the splash zone 70 as bubbles of upwardly passing conveying gas erupt into the splash zone 70 from the surface 65 of the discrete bed 60.

At typical conveying gas velocities on the order of 10 feet per second, a discrete bed 60 of fluidized particulate material having a well defined surface 65 is formed. The particle density within the discrete bed 60 is relatively uniform at a relatively high value on the order of 1000 pounds of particulate material per pound of conveying gas. However, at the surface 65 of the bed 60, there is an abrupt and very sharp drop in particle density with the particle density then continuously decreasing with increasing distance into the splash zone, i.e., increasing distance above the surface of the discrete bed.

It is envisioned that the average particle density in the splash zone 70 would be a function of the input particle flow rate. That is, it is believed that the introduction of particulate material into the splash zone 70 is a displacement controlled process. Therefore, once an equilibrium bed level is established, typically a few inches below the openings of the transport conduits 14, the rate of eruption of particulate material from the bed surface 65 into the splash zone 70 will be equal to the rate of input of particulate material to the discrete bed 60 through the particulate feed means 30 which open into the bed at a location below the surface of the discrete bed 60.

Figure 2:
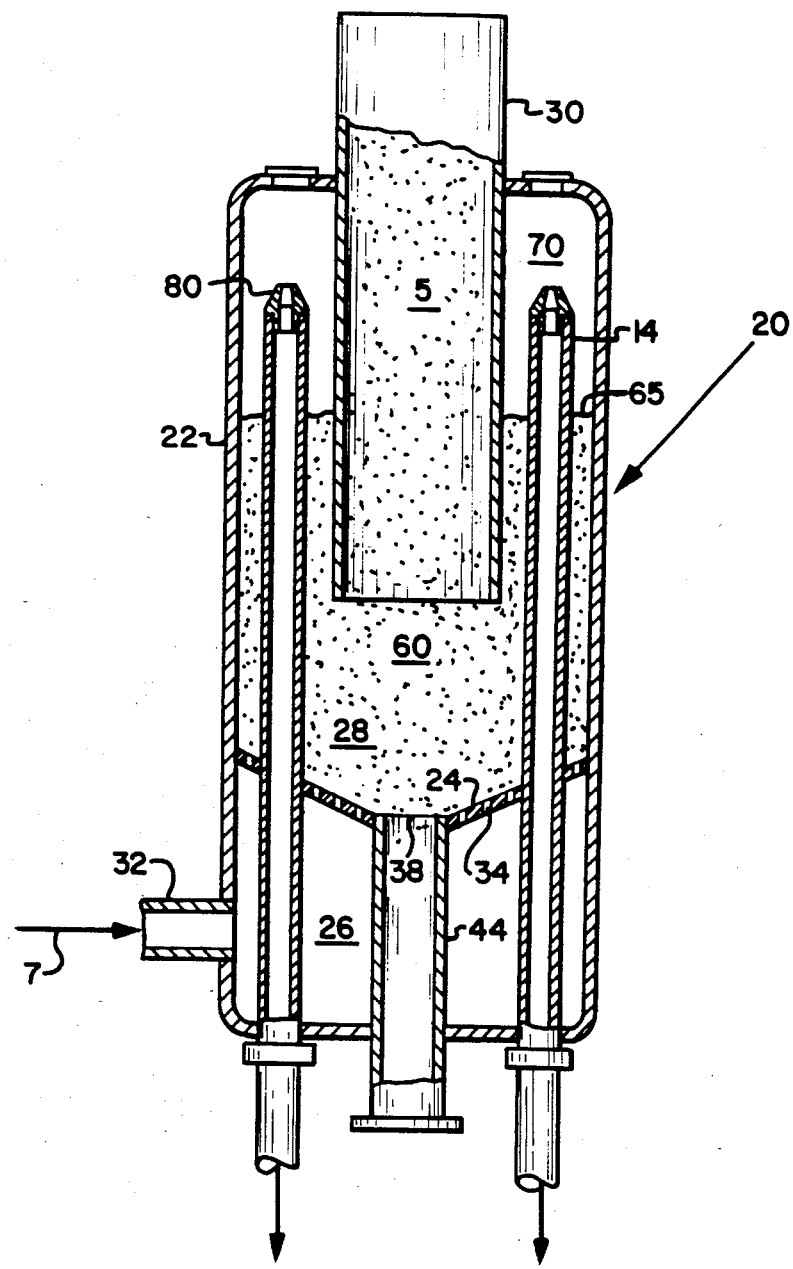
FIG. 2 is a cross-sectional elevational view of the feeder apparatus of the present invention.

Although the transport conduits 14 may be tubular members having any desired cross-sectional shape, the transport conduits 14 illustrated in the preferred embodiment of the apparatus of the present invention shown in FIG. 2 comprise a plurality of stationary, elongated tubular members of circular cross-section arranged at circumferentially spaced intervals in the annular space between the particulate feed means 30 and the housing 22. The transport conduits 14 penetrate the housing 22 from below and extends vertically upward through the gas plenum 26, thence through the bed support bed 24 and the discrete bed 60 to open into the splash zone 70 at a uniform distance above the surface 65 of the discrete bed 60.

In accordance with the present invention, each transport conduit 14 is equipped with an open-ended orificing nipple means 90 replaceably mounted to the open end thereof. Each nipple 80 comprises a nipple body 82 defining a diverging flow passage 84 therethrough expanding from an inlet 86 opening to the fluidizing plenum to an outlet 88 opening to the flow passageway of the transport conduit to which the nipple is mounted. The cross-sectional area of the inlet 86 of each nipple 80 is less than the cross-sectional area of the outlet 88 of the nipple 80 and the cross-sectional area of the inlet to the flow passageways of transport conduits 14. Therefore, the inlet 86 of each nipple 80 acts as an orifice and therefore effectuates a throttling of the flow through its associated transport conduit. Therefore, the output of particulate material entrained in conveying gas passing through transport conduits 14 may be selectively increased or decreased by providing a nipple 80 having an appropriately larger or smaller inlet 86.

The use of replaceable nipples 80 in conjunction with stationary transport conduits 14 provides a mechanically simple and inexpensive means for adjusting the flow of particulate material and conveying gas amongst the plurality of transport conduits. In instances where it is not practical to provide transport conduits of equal length between the feeder 20 and the fluidized bed 10, there would inherently exist an imbalance in flow through the transport conduits due to the fact that the pressure drop through any conduit would be directly proportional to its length. As the flow through a conduit is related to the pressure drop therethrough, the flow of particulate material through a shorter length of conduit would be greater than that through a longer length conduit. However, by providing nipples having appropriately sized inlets, the orifice effect of the nipple inlet can be used to compensate for the differing pressure drops associated with the varying length conduits, thereby eliminating the flow imbalance and providing for a uniform flow of particulate material and conveying gas through conduits of differing length.

Preferably, the nipple body comprises an open-ended, frustrum-shaped shell having a base with a cross-sectional shape adapted to mate with the transport conduit to which it is mounted and having a sleeve extending outwardly from the base of the frustrum-shaped shell. The sleeve is adapted to provide, upon insertion into the inlet of the transport conduit, a slip-fit mounting of the nipple body into the open end of the transport conduit. The nipple body, being a frustrum-shaped shell, will have a sloping external surface which is inherently self-cleaning.

Figure 3:
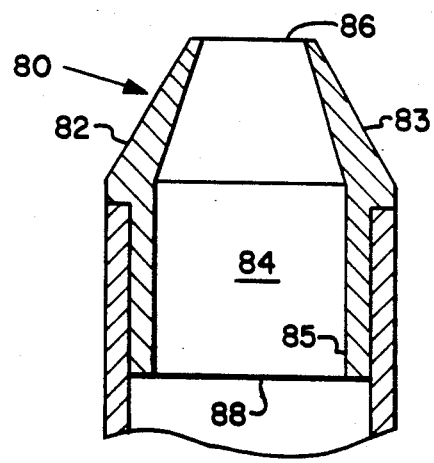
FIG. 3 is an enlarged cross-sectional elevational view within line 3—3 of FIG. 2.

In the embodiment of the apparatus shown in the drawing, wherein the transport conduits 14 are elongated tubular members having a circular cross-section, the frustrum-shaped nipple body 82 comprises an open-ended truncated conical shell 83 having a cylindrical sleeve 85 extending outwardly from the larger diameter end of the truncated shell 83 as illustrated in FIG. 3. The cylindrical sleeve 85 is provided with an outside diameter only slightly less than the inside diameter of the transport conduit 14 so as to provide for a slip-fit mounting of the nipple 80 into the open end of the transport conduit 14. Additionally, the conical shell 83 provides an external surface which is inherently self-cleaning. By providing a conical body having a sufficiently steep slope on its external surface, particulate material will slide off rather than adhere to and deposit upon the external surface of the conical body.

Accordingly, the present invention provides a feed apparatus for fluidizing a particulate material for transport to a multiplicity of end-points in a conveying gas wherein the output of the feeder through any particular transport conduit leading from the feeder can be varied relative to the other transport conduits by merely replacing the orificing nipple associated therewith with another orificing nipple having a larger or smaller inlet as appropriate.

Although the feed apparatus 20 of the present invention is shown as feeding a fluidized bed furnace 10, it is to be understood that the feed apparatus 20 of the present invention may be utilized in any situation where it is desired to transport a particulate material in a conveying gas to two or more end-point destinations. Accordingly, it is intended that the present invention be limited in spirit and scope only by the following claims.

I claim:

1. An apparatus for fluidizing a particulate material for transport in a conveying gas comprising:
   a. a vertically disposed housing defining a chamber therein;
   b. a perforatd bed support plate having gas flow passages therethrough, said bed support plate disposed within said housing so as to extend across said housing thereby dividing said chamber into a gas plenum beneath said bed support plate and a particulate fluidizing plenum above said bed support plate;

c. particulate feed means opening into the particulate fluidizing plenum so as to deposit particulate material onto said bed support plate;

d. gas supply means opening into said gas plenum for conveying pressurized conveying gas to said gas plenum to pass therefrom through the gas flow passages in said bed support plate whereby a portion of the particulate material fed to the fludizing plenum is fluidized so as to establish a descrete bed of fluidized material adjacent to said bed support plate and a splash zone within said fluidizing plenum above said discrete bed;

e. a plurality of transport conduits, each penetrating said housing and having an inlet opening into the splash zone for receiving particulate material and conveying gas therefrom and conveying said received particulate material from said housing in the conveying gas; and f. orificing nipple means mounted to the inlet of at least one of said plurality of transport concuits, said orificing nipple means having a nipple a body adapted to mount to the inlet or a transport conduit, said nipple body having an inlet opening to the splash zone of the fluidizing plenum and an outlet opening to the inlet of the transport conduits associated therewith, the inlet to said nipple body having a cross-sectional area less than the cross-sectional area of the inlet to the transport conduit associated therewith, said nipple body defining a diverging flow passageway therethrough from the inlet of the nipple body to the outlet of the nipple body, said nipple body comprising an open-ended frustrum-shaped shell having a base with a cross-sectional shape adapted to mate with the transport conduit to which it is mounted, and a sleeve extending outwardly from the base of the frustrum-shaped shell, the sleeve adapted for insertion into the inlet of the transport conduit to which it is mounted so as to provide a slip-fit mounting therewith.

* * * * *